(12) United States Patent
Van Luchene

(10) Patent No.: US 7,666,095 B2
(45) Date of Patent: Feb. 23, 2010

(54) SECURING CONTRACTS IN A VIRTUAL WORLD

(75) Inventor: Andrew Stephen Van Luchene, Santa Fe, NM (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 243 days.

(21) Appl. No.: 11/624,662

(22) Filed: Jan. 18, 2007

(65) Prior Publication Data

US 2007/0117615 A1    May 24, 2007

Related U.S. Application Data

(63) Continuation-in-part of application No. 11/279,991, filed on Apr. 17, 2006, which is a continuation-in-part of application No. 11/355,232, filed on Feb. 14, 2006.

(60) Provisional application No. 60/727,121, filed on Oct. 14, 2005.

(51) Int. Cl.
*G06F 17/00* (2006.01)
(52) U.S. Cl. .................................................. 463/29
(58) Field of Classification Search .............. 463/29; 705/1, 35
See application file for complete search history.

(56) References Cited

U.S. PATENT DOCUMENTS

| | | | |
|---|---|---|---|
| 5,970,470 A | 10/1999 | Walker | |
| 6,009,458 A | 12/1999 | Hawkins et al. | |
| 6,141,653 A | 10/2000 | Conklin et al. | |
| 6,341,353 B1 | 1/2002 | Herman et al. | |
| 6,587,835 B1 | 7/2003 | Treyz et al. | |
| 6,656,050 B2 | 12/2003 | Busch et al. | |
| 6,929,550 B2 | 8/2005 | Hisada | |
| 7,394,459 B2 * | 7/2008 | Bathiche et al. | 345/175 |
| 7,552,132 B2 * | 6/2009 | Berry et al. | 707/101 |
| 2002/0072412 A1 | 6/2002 | Young et al. | |
| 2002/0086733 A1 | 7/2002 | Wang | |
| 2002/0160838 A1 | 10/2002 | Kim | |
| 2004/0043806 A1 | 3/2004 | Kirby et al. | |
| 2004/0203588 A1 | 10/2004 | Yamagishi | |
| 2005/0033601 A1 | 2/2005 | Kirby et al. | |
| 2005/0137015 A1 | 6/2005 | Rogers et al. | |
| 2005/0143174 A1 | 6/2005 | Goldman et al. | |
| 2005/0177428 A1 | 8/2005 | Ganz | |
| 2005/0182693 A1 | 8/2005 | Alivandi | |
| 2005/0192864 A1 | 9/2005 | Ganz | |
| 2005/0250415 A1 | 11/2005 | Barthold | |
| 2006/0035692 A1 | 2/2006 | Kirby et al. | |
| 2006/0079150 A1 | 4/2006 | Filoseta et al. | |
| 2006/0100018 A1 | 5/2006 | Ganz | |
| 2006/0178217 A1 | 8/2006 | Jung et al. | |
| 2006/0178899 A1 | 8/2006 | Jung et al. | |
| 2006/0178964 A1 | 8/2006 | Jung et al. | |
| 2006/0178965 A1 | 8/2006 | Jung et al. | |
| 2006/0178968 A1 | 8/2006 | Jung et al. | |
| 2006/0178975 A1 | 8/2006 | Jung et al. | |
| 2006/0178985 A1 | 8/2006 | Jung et al. | |
| 2006/0195376 A1 | 8/2006 | Jung et al. | |
| 2006/0195377 A1 | 8/2006 | Jung et al. | |
| 2006/0195378 A1 | 8/2006 | Jung et al. | |

(Continued)

*Primary Examiner*—Ronald Laneau

(57) ABSTRACT

The disclosure provides novel video game methods and systems for enforcing contracts within video game environments. Methods and systems of the invention include virtual and real world penalties and remedies for entities that breach contracts or other obligations undertaken in the virtual world.

11 Claims, 4 Drawing Sheets

U.S. PATENT DOCUMENTS

| | | |
|---|---|---|
| 2006/0195394 A1 | 8/2006 | Jung et al. |
| 2006/0224505 A1 | 10/2006 | Jung et al. |
| 2006/0229976 A1 | 10/2006 | Jung et al. |
| 2006/0235790 A1 | 10/2006 | Jung et al. |
| 2006/0235791 A1 | 10/2006 | Jung et al. |
| 2007/0016514 A1* | 1/2007 | Al-Abdulqader et al. ...... 705/37 |
| 2008/0139317 A1* | 6/2008 | Sheikh ........................ 463/42 |

* cited by examiner

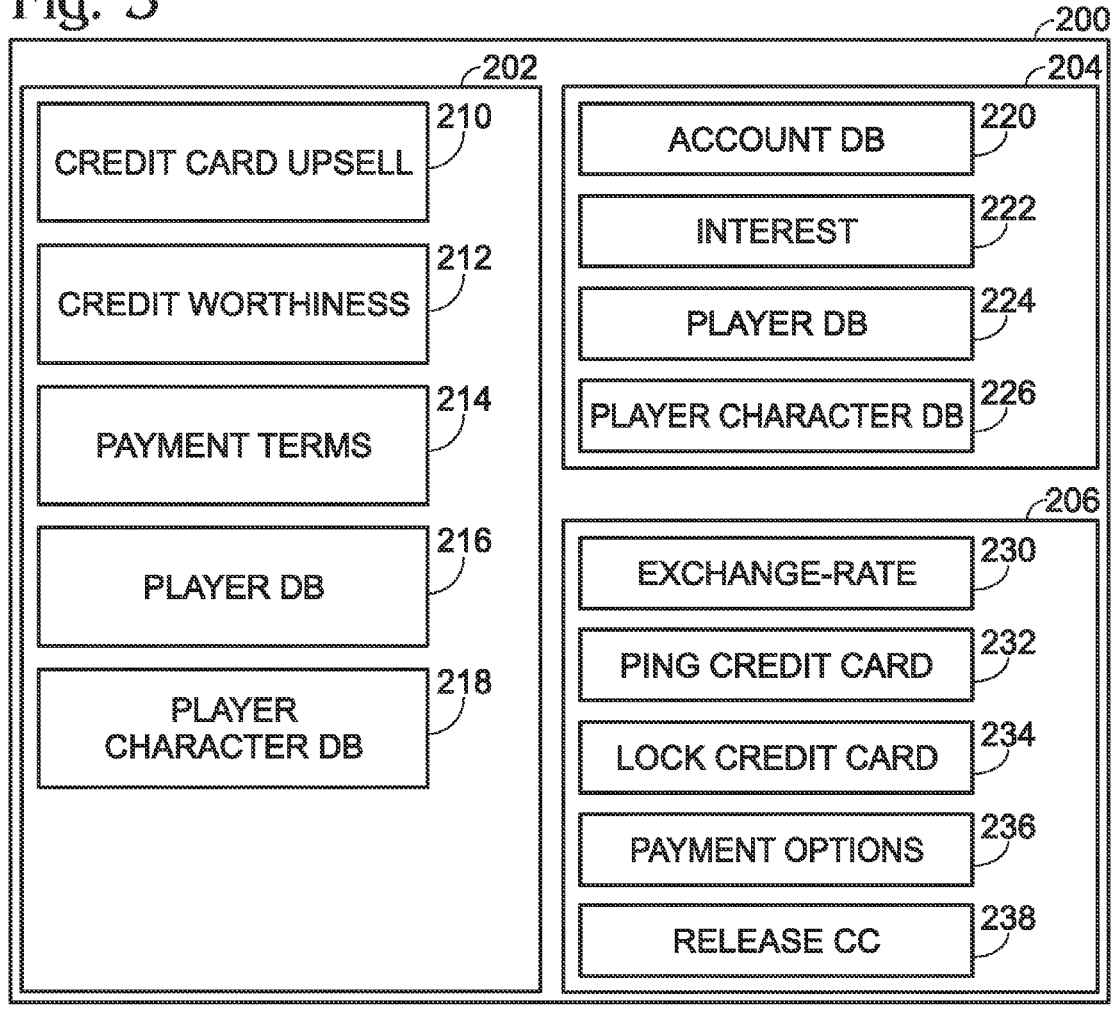
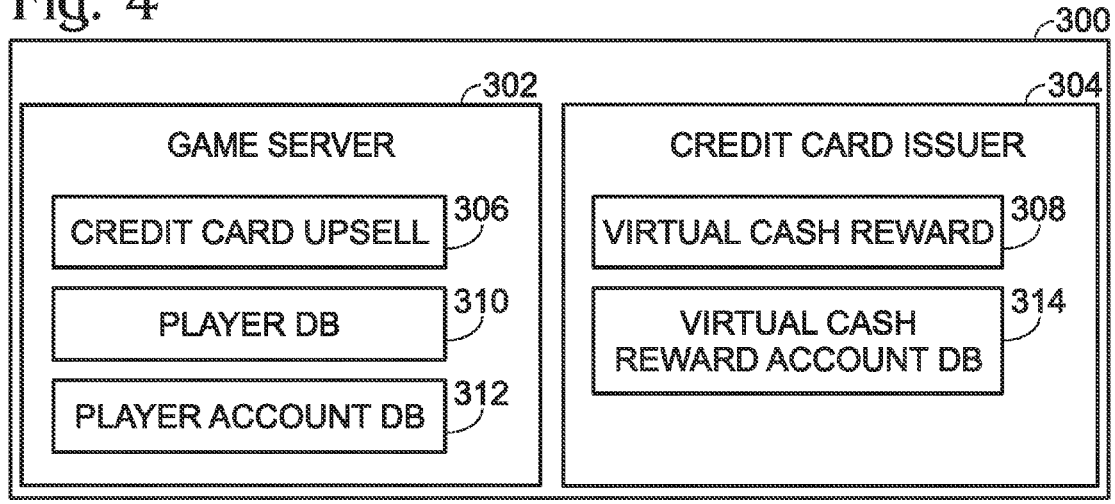

SECURING CONTRACTS IN A VIRTUAL WORLD

PRIORITY CLAIM

The following application is a continuation in part of U.S. patent application Ser. No. 11/279,991, "Securing Virtual Contracts with Credit" filed Apr. 17, 2006, which is a continuation in part of U.S. patent application Ser. No. 11/355,232, "Online Game that Facilitates Binding Contracts Between Player Characters" Filed Feb. 14, 2006, which claims priority to U.S. Provisional Application Ser. No. 60/727,121 "Methods, Processes, and System to Enhance a Player Experience of a Video Game" filed Oct. 14, 2005. Each of which is hereby incorporated by reference.

BACKGROUND

Video games which are accessible to multiple players via a server or peer to peer network are well known. For example, hundreds of thousands of players access games known as massive multi-player online games (MMOGs) and massive multi-player online role playing games (MMORPGs). Players of these games customarily access a game repeatedly (for durations typically ranging from a few minutes to several days) over a given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community.

It would be advantageous to provide improved methods and apparatus for increasing the enjoyment and/or longevity of video games including, but not necessarily limited to MMOGs and MMORPGs.

BRIEF DESCRIPTION OF THE DRAWINGS

FIG. 3 is a block diagram depicting a system 200 according to one embodiment of the present invention.

FIG. 4 is a block diagram depicting a system 300 according to one embodiment of the present invention.

DETAILED DESCRIPTION

Definitions

Figure 1:
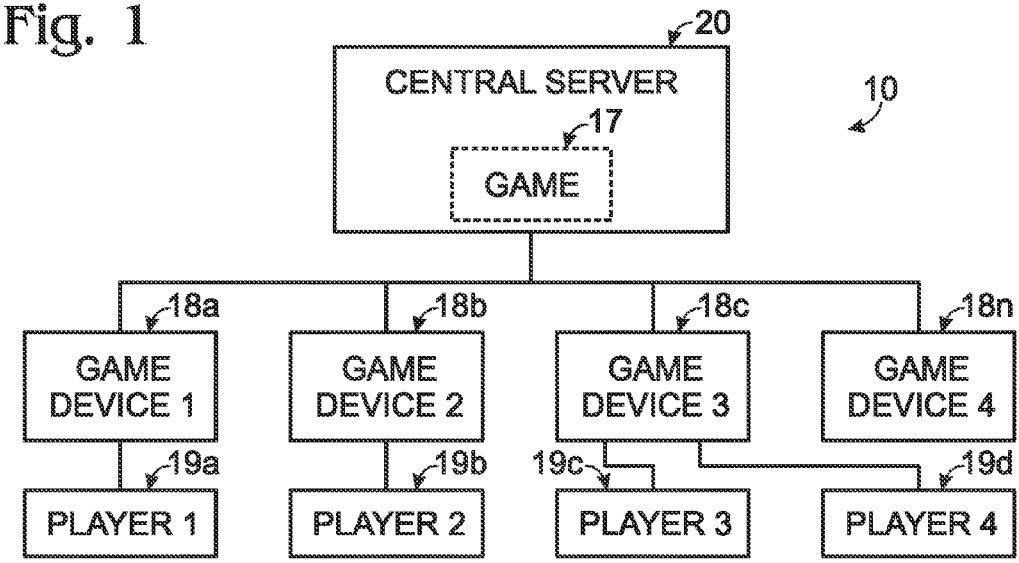
FIG. 1 is a block diagram depicting a network according to an embodiment of the present disclosure.

Unless stated to the contrary, for the purposes of the present disclosure, the following terms shall have the following definitions:

Credit Card—a credit instrument issued by a real or virtual world institution to a player that allows the player to make purchases by providing an account identifier (e.g. a credit card number) rather than cash or other currency. An example is a credit card like those issued by Visa, MasterCard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, lines of credit and the like.

Virtual credit card—a financial instrument issued in a virtual environment that acts in the virtual environment for virtual currency the way a real world credit card acts in the real world for real currency.

Real Cash Value—the value in real dollars of the virtual currency. This value can be determined by multiplying the value of a virtual currency amount by the current exchange rate to real dollars.

Total virtual obligation amount—the total amount of the virtual financial obligation(s) associated with a player character's account.

Virtual Contract—An enforceable agreement between a first player character and either another player character, a game server, or a third party. Some examples of virtual contracts are provided in U.S. Provisional Patent Application Ser. No. 60/652,036, which is hereby incorporated by reference in its entirety for all purposes.

Virtual—shall mean in a video game environment or other intangible space.

Virtual World—a world created in an online game such as World of Warcraft, or a virtual community such as Second Life, Eve or There.com.

Virtual Creditor—shall mean a first player character or other entity who is owed a virtual obligation by a second player character.

Virtual Credit Score—a score given to player characters in a video game based on one or more of the following criteria: the virtual assets they possess, the age of the character account, the type of account, e.g. basic or premium, the available credit line of the credit card associated with the account, the existing virtual financial obligations of the player character account, the player character's payment history including days to pay, amounts overdue or delinquent, and/or the player character's real world credit score, and/or the factors used in the real world to determine a credit score.

Virtual Financial Account—a virtual account issued to a player character by a virtual bank, game server or third party where virtual cash can be deposited and withdrawn.

Virtual Financial Obligation—An agreement by a player character or entity to pay one or more game attributes to another player character, entity or game server. This obligation can be a one time payment, or multiple payment over time. The obligation can specify that payments are due on virtual or real dates.

Virtual Financial Intermediary—Financial intermediaries are institutions including depository institutions, contractual savings institutions, and investment intermediaries which offer financial products and services for use within the virtual environment. The various financial intermediaries available in the virtual environment may each serve different or overlapping purposes and provide means for using, saving, borrowing and transferring currency.

Virtual Financial Obligation Value—the in game value of the obligation. For virtual cash the value may be stated as a virtual and/or real cash amount. For other game attributes, the value can be determined by generating a virtual cash market value for the item based on the current value in an online marketplace or exchange. The value of the obligation may be fixed or variable and may also be set as a condition of the player contract and/or by the game server or other entity.

Billing Information—shall mean any information pertaining to billing a player for playing a game, accessing a game, purchasing goods or services, or any other reasons. Billing information may include such real world information as a billing address, credit card account number, bank account number, pay pal account number or other payment facilitator, or the account number of any other financial entity providing a real world credit line or any other payment-related information.

Character or "player character"—a persona created and controlled by a player in a video game.

Avatar—the virtual representation of a player character.

Character Account—an account that tracks character attributes.

Character Attribute—any quality, trait, feature or characteristic a particular Character can have that is stored in the corresponding Character Account. Character Attributes may include, but are not limited to:

1. A character score
2. A virtual object
3. The physical appearance of a character
4. An emblem or mark
5. A synthetic voice
6. Virtual currency
7. Virtual help points or credits
8. The ability to join groups of other players at a later time
9. A score for subsequent matching of later game parameters
10. A relationship with another character
11. A genetic profile or makeup
12. A skill or skill level
13. A ranking Character Life—a fixed or variable, finite or infinite period of virtual or real world time that a player character can exist in a game environment.

Character Skills—game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

Computer Generated (CGC) or Non-Player (NPC) Character—any character that is controlled by the game system and/or a computer program and/or rules established by the game system and/or a player and not by a player on a continuous basis.

Game performance parameter—any aspect of a Video Game by which a player character's performance can be measured. Game Parameters shall include, but not be limited to:

1. Completing all or part of a mission
2. Playing for a certain period of time
3. Winning a match against another player character or computer generated character
4. Reaching a certain level or score
5. using or obtaining an ability or technology
6. kill/death ratios
7. obtaining, creating or modifying an object
8. solving a puzzle
9. accuracy with weapons
10. effective use of the proper weapon
11. killing a certain character/creature
12. getting through or to a certain geographic area
13. decreasing or increasing Karma Points
14. getting, buying, exchanging or learning a new skill or player attribute
15. having a child
16. getting married
17. obtaining, buying, trading, producing or developing raw materials
18. producing goods or services
19. earning income
20. earning a higher rank in an army
21. winning an election among two or more player characters
22. achieving deity or other status
23. improving player character status or caste
24. assisting other player characters with any of the above
25. speed of accomplishing or changing the rate or trends of any or all of the above.

In-game Marketplace—shall mean a virtual environment where Characters can exchange items, attributes, or any other exchangeable game element.

Novice Player—shall mean a player that is identified as requiring the help of an expert to complete a Game Parameter.

Player—shall mean an individual who can register an account with a Video Game Central Server or within a peer-to-peer network and create Characters that can interact with other Characters in a Virtual Environment, and/or that can authorize a NPC to act on the player's behalf.

Player Account—shall mean an account on the Video Game Central Server or within a peer-to-peer network that contains a Player profile including personal, billing, and character account information.

Player Attribute—shall mean any attribute that can be applied to a player account. Player Attributes shall include, but not be limited to:

1. Real Currency.
2. Discount of monthly fees for playing game.
3. Monthly fee for playing a game.
4. Interest rates for use of or borrowing real or virtual cash amounts.
5. Global character attribute settings for all characters created by player across multiple games.
6. Rewards for encouraging another player to signup to play.

Player to Player Contract—a real and/or virtual but binding contract between player characters that allows the players to provide or exchange game attributes to one another. Once a player-to-player contract is established, the game server or peer-to-peer network automatically distributes acquired game attributes between the player characters based on the contract conditions.

Video Game—a game played on a Video Game Consul that may or may not be networked to a Video Game Central Server or within a peer-to-peer network.

Video Game Consul—a device comprising a CPU, memory and optional permanent storage residing at a player location that can allow for the playing of video games. Examples include, home PCs, Microsoft Xbox, and Sony Playstation.

Video Game Central Server—a CPU, memory and permanent or temporary storage that is connected to multiple Video Game Consuls that allows for Massive Multi Player Online Video Games to be played.

"Game Environment"—a particular level or area within a virtual world. Each game environment may have its own rules, regulation, currency, government, managers, etc. Game environments may exist within other game environments.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like. It does not imply certainty or absolute precision, and does not imply that mathematical processing, numerical methods or an algorithm process be used. Therefore "determining" can include estimating, predicting, guessing and the like.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof. Thus a description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, or a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Description

Massive multi player online games (MMOGs) or massive multi-player role-playing games (MMORPGs) are computer game which are capable of supporting hundreds, thousands, or millions of players simultaneously. Typically, this type of game is played in a giant persistent world where the game continues playing regardless of whether or not real players are logged in. Players commonly access these games through a network such as the Internet, and may or may not be required to purchase additional software or hardware in order to play the game. Such networks allow for people all over the world to participate and interact with each other in a virtual environment. The present disclosure provides systems and methods which contribute to the evolution and longevity of such a game.

The herein described aspects and drawings illustrate components contained within, or connected with other components that permit play in the virtual environment. It is to be understood that such depicted designs are merely exemplary and that many other designs may be implemented to achieve the same functionality. Any arrangement of components to achieve the same functionality is effectively associated such that the desired functionality is achieved. FIG. 1 provides an exemplary network which may be used to support a virtual environment.

Referring to FIG. 1, a network 10 according to one embodiment includes a central server 20 in communication with a plurality of video game playing units 18. Those of ordinary skill in the art will appreciate that any number of video game playing units may be in communication with the central server. Typically, the number of video game playing units changes at various times as players join games and as players stop playing games. Similarly, more than one server may operate to coordinate the activities of the video game playing units, as is well known in the art.

Central server 20 may comprise any computing device (e.g., one or more computers) capable of communicating with other computing devices. The server 20 typically comprises a processor which is in communication with a storage device, such as an appropriate combination of RAM, ROM, hard disk, and other well known storage media. Central server 20 may comprise one or more personal computers, web servers, dedicated game servers, video game consoles, any combination of the foregoing, or the like.

Each video game device 18 may comprise any device capable of communicating with central server 20, providing video game information to a player, and transmitting the player's desired actions to the central server. Each video game device typically comprises a processor which is in communication with a storage device, such as an appropriate combination of RAM, ROM, hard disk, and other well known storage media. Suitable video game devices include, but are not limited to, personal computers, video game consoles, mobile phones, and personal data assistants (PDAs).

Some or all of video game 17 can be stored on central server 20. Alternatively, some or all of video game 17 may be stored on the individual video game devices 18. Typically, the video game devices are able to communicate with one another. Such communication may or may not be facilitated by central server 20. Accordingly, a player 19a accessing video game 17 via game device 18a may be able to play with a player 19b accessing video game 17 via game device 18b. As shown, it may be possible for multiple players (e.g. 19c, 19d) to access central server 20 via the same game device (e.g. 18c).

Regardless of whether video game 17 is stored on central server 20 or video game devices 18, server 20 is typically configured to facilitate play of the game between multiple game players.

Those having skill in the art will recognize that there is little distinction between hardware and software implementations. The use of hardware or software is generally a choice of convenience or design based on the relative importance of speed, accuracy, flexibility and predictability. There are therefore various vehicles by which processes and/or systems described herein can be effected (e.g., hardware, software, and/or firmware) and that the preferred vehicle will vary with the context in which the technologies are deployed.

At least a portion of the devices and/or processes described herein can be integrated into a data processing system with a reasonable amount of experimentation. Those having skill in the art will recognize that a typical data processing system generally includes one or more of a system unit housing, a video display device, memory, processors, operating systems, drivers, graphical user interfaces, and application programs, interaction devices such as a touch pad or screen, and/or control systems including feedback loops and control motors. A typical data processing system may be implemented utilizing any suitable commercially available components to create the gaming environment described herein.

While virtual environments as previously described allow for interactions between players, the amount and depth of interaction may be limited by the parameters of the game. For example, most virtual environments lack methods of enforcement for virtual contracts. This lack of enforcement makes players reluctant to enter into transactions that do not have immediate results, decreasing the depth and sophistication of play available.

Various embodiments of the invention address this issue by providing a means for enforcing contracts and providing both virtual and real world consequences for characters and players who fail to meet the terms of contracts or other obligations to which they are a party. Such a system allows for the development of the game and widens the opportunities available to players, increasing the enjoyment of the players and the depth of play available.

A contract is a binding agreement between two or more parties for performing, or refraining from performing, some specified virtual act(s) in exchange for lawful consideration. Contracts in a virtual environment may be entered into for a variety of reasons, for example, to borrow virtual money; to rent virtual items; to receive virtual financing; to create virtual items; for futures in virtual goods or services; for assistance with solving a game mission; for assistance with completing a game project; to form virtual relationships; to form virtual partnerships; to try to prevent another player character from solving a game mission or completing some aspect of the game; for the sale and purchase of virtual goods and services; for virtual insurance; for virtual transactions such as shipping contracts; for use of virtual items for example in per use fees, taxes, licenses, rentals etc.; to settle disputes in the virtual environment; to abide by the rules and regulations of the game; or for any of a myriad of other reasons including, but not necessarily limited to those reasons that contracts are generally entered into in the real world.

A contract may be made between any two or more entities in the virtual environment. For example, a party to a contract may be or include a player, a character, a game environment, a game server, or any combination thereof. In some embodiments, there may be multiple characters or non-character entities such as game environments on each side of the contract. For ease of description, virtual contracts are discussed throughout the application as occurring between two parties though it is understood that each "party" may encompass multiple entities. For further ease of discussion, while various examples or discussions may refer to a "character" or "player" being a party in a contract, it should be understood that any suitable entity may be a party in any type of contract described herein and that no limitation is intended when a particular party is described as being a particular type of entity.

Figure 2:
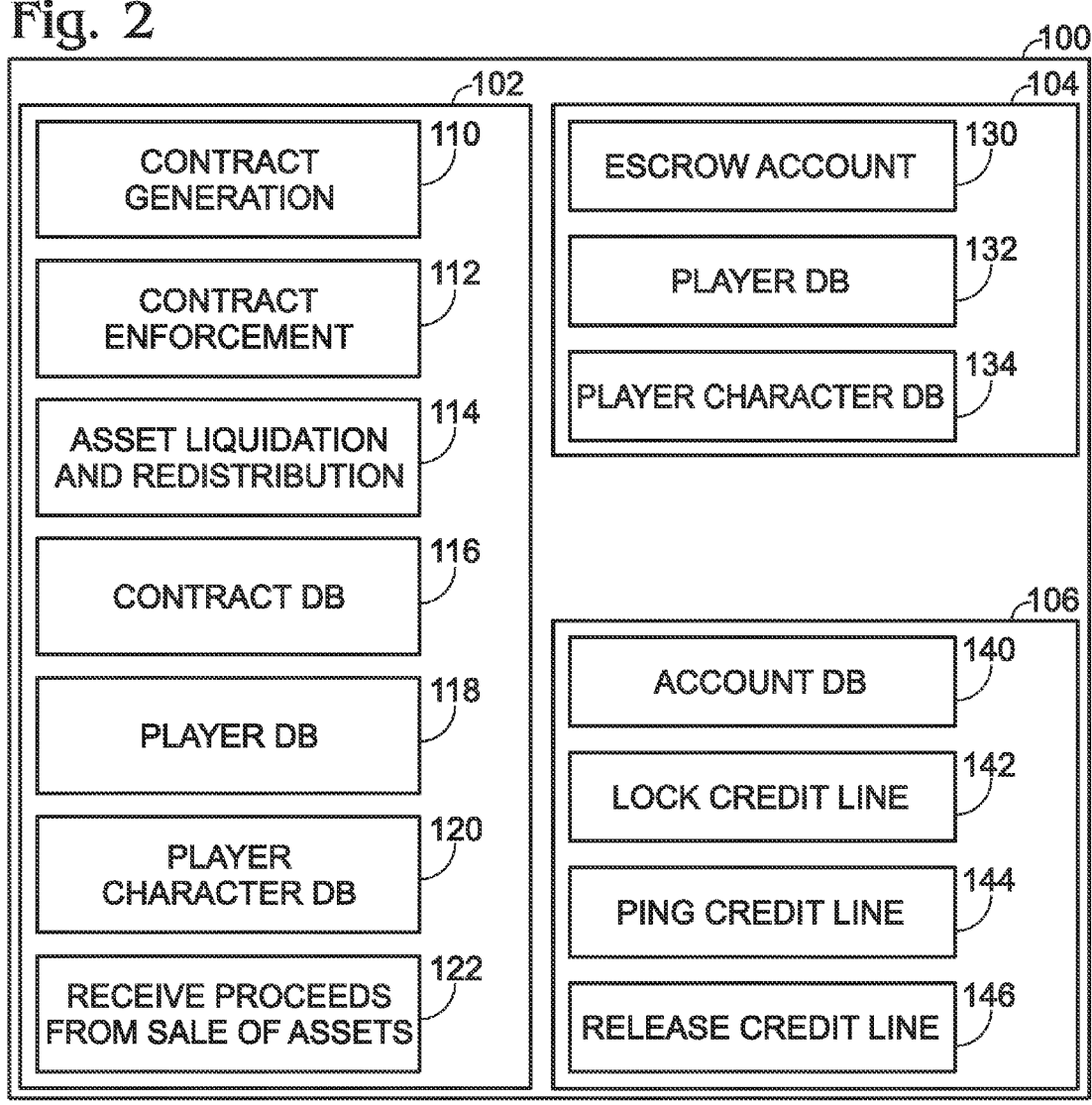
FIG. 2 is a block diagram depicting a system 100 according to one embodiment of the present invention.

An exemplary system 100 configured to provide the virtual environment described above is shown in FIG. 2. As shown, system 100 may include a game server 102, a bank server 104, and a credit card server 106.

Game server 102 may include such programs as contract generation program 110, contract enforcement program 112, and asset liquidation and redistribution program 114. Game server 102 may further include a variety of databases such as contract database 116, player database 118, and player character database 120. Bank server 104 may easily be any other financial intermediary or neutral third party server and may include databases such as escrow account database 130, player database 132 and player character database 134. Credit card server 106 may include programs such as lock credit line 142, ping credit line 144, release credit line 146 and databases such as account database 140.

A virtual contract may be generated by any means applicable. In one embodiment, two or more parties negotiate a virtual contract. In another embodiment, two or more parties may select an applicable virtual contract from a contract database such as contract database 116, and complete the necessary information regarding the specifics of the virtual contract. In yet another embodiment, completed virtual contracts are stored in contract database 116. In a further embodiment, one party may present a virtual contract for signature to another party. In another embodiment, two parties may create a Master Agreement which governs all subsequent interactions of a particular type between those parties. Such Master Agreements may be stored, for example, in contract database 116. In still another embodiment, an organization may maintain a Master Agreement to which multiple parties may subscribe without alteration. All parties to such a Master Agreement agree to be bound by the terms of the agreement in their interactions with other signatories which are within the scope of the Master Agreement. Such a Master Agreement may be stored in contract database 116, or may be maintained by the governing entity that oversees the agreement. In yet another embodiment, a virtual contract may be generated using a contract generation program such as contract generation program 110. Such a program may generate a virtual contract using some or all of the following steps:

1. Receive a virtual contract initiation request from a party.
2. Determine contract obligations and conditions.
3. Output obligations and conditions.
4. Receive acceptance of obligations and conditions.
5. Retrieve or receive collateral such as credit line associated with party.
6. Activate and store virtual contract along with obligations and conditions.
7. Transfer any assets as required by obligations and conditions.

Virtual contracts may be tailored to meet specific conditions, for example loans may include loan amounts, terms, interest, and limits on use. A virtual contract to receive a dividend, such as through a stock, may include information on the shares held and the value of the shares. A virtual contract to receive an interest payment, such as through a bond, may include information on the terms of the bond. A virtual financing contract may include the virtual cash payment amount, the number of payments and the dates of each payment. A virtual purchasing contract may include the transfer of the item purchased. Virtual contracts to create items may include costs, resources, blueprints, date of delivery, levels of quality, skills required, etc. Virtual futures contracts may include information such as the specified later date and price and the quantity of goods to be purchased. Virtual service contracts, such as help with solving a mission, may include such information as a description of the mission, the date by which the mission must be completed and any penalties that may be assessed if the mission if it is not completed. Virtual insurance contracts may include a description of the virtual object being insured, an estimated value, premium amounts and dates of payments, and the amount to be paid if the insurance is claimed. Virtual shipping contracts may include such terms as virtual point of origination, virtual destination, demurrage rates and delivery date. Virtual use contracts may include the virtual service sought to be used, the cost of using such a service, and the length of time for using the service which is being purchased. Virtual banking contracts may include agreements to pay a specified interest rate or interest rate payment schedule in return for a deposit. Virtual tax contracts may include agreements to pay taxes to a city in order to receive a benefit such as citizenship.

In one embodiment, virtual contracts are secured. Such security provides a means for enforcing a virtual contract. The security may be provided by financial or non-financial collateral which guarantees that a character will abide by the terms of the contract. One, all, or none of the characters may be required to provide collateral. The amount of the collateral may be determined by the parties, may be based on the value of the contract, i.e. the replacement cost if a party defaults, the amount of payments owed, etc., or may be set by a third party such as the game server or any combination thereof. In one embodiment the required collateral is fixed. In another embodiment, the required collateral is a floating amount. For example, the value of a virtual contract may increase between the time the virtual contract is signed and the time performance is completed in accordance with the varying values of the goods or services that compose the virtual contract. Such a variance may require that the amount of collateral be adjusted during the term of the virtual contract, for example in a marked to market situation.

For contracts that do not have a readily identifiable liquidated damage amount, for example barter transactions or service for service contracts, a virtual financial value may be determined by the parties, by the server, by an independent third party, or by a combination of any of these. The virtual financial value may be determined before the contract formed, at the time the contract is formed, at the time of breach, etc. Moreover, such value may be determined periodically or in real time during the term of the contract.

The collateral may belong to the one of the parties to the virtual contract, or to a third party who is providing a guarantee for another party, for example as a co-signor on a loan. The collateral may be a real world credit line supported by a real world financial institution, a real world financial security, a real world asset, a virtual financial institution, a virtual credit line, a virtual financial security, a virtual property or business, a virtual asset, a real world property, a promise to perform certain services or any combination thereof. The collateral may be held in escrow by each party, or may be held in trust by a neutral third party such as a financial intermediary or a holding company.

In one embodiment, the collateral is a real world credit line. Each party or member of a party may indicate the amount of collateral in the form of the real world credit line he is willing to allocate against a virtual contract. In another embodiment, a virtual contract may be valued and each party may be required to secure their portion of the contract with a real world credit line. Such a real world credit line may be a credit card, debit card, private or public payment facilitator account (i.e. paypal), brokerage account, equity line, play time card, escrow account, margin account, annuity account or other financial security and/or the financial security of another player character and/or a non-playing third party, such as a bank, credit institution, credit card company, mutual fund, hedge fund, insurance company, etc. or any combination of these or any other type of real world financial instrument or institution that provides a credit line or holds or secures assets for third parties.

According to another embodiment, real world credit lines can be locked by the bank owner or game server, and/or just periodically "pinged" to ensure their validity and that sufficient credit is available to underwrite the loan. The continuing availability of the real world credit line may be determined by any means applicable. According to one embodiment, Ping Credit Line program 144 may be configured to complete some or all of the following steps:

1. Determine that a player character has an outstanding virtual contract.
2. Determine real and virtual cash value of contract.
3. Retrieve credit card associated with contract.
4. Ping credit card for the outstanding real cash value of the contract.
5. If credit equal to contract amount is not available, request additional collateral.

In the event a credit line securing the virtual contract is cancelled or closed, the system could receive notification that the credit card or credit line is no longer valid. Upon notification that a credit line is no longer valid, the bank, system, game owner, server owner, or other contract holder may require cancellation of the contract, acceleration of the contract, require the player to provide a new credit line, require additional collateral to secure the contract, foreclose on the contract, secure a secondary line of credit which was previously provided or may be secured from other player characters, notify other characters of the opportunity to purchase a contract, foreclose on virtual assets held by the defaulting character, freeze the virtual accounts of the character or player, or any combination thereof.

The lock on the real world credit line may be released when the virtual contract is completed. According to one embodiment, Release Credit Line program 146 may be configured to:

1. Receive indication that virtual contract has been completed.
2. Retrieve credit card associated with virtual contract.
3. Notify credit card issuer to release credit line.

In another embodiment, a real or virtual credit line can secure a milestone amount, an otherwise calculated amount, the entire value of the contract, or a combination thereof. In calculating the amount to be secured factors such as game growth rates, taxes, inflation and/or exchange rates, credit worthiness of the character or player, riskiness of the contract, the amount of debt the parties to the contract have outstanding, or any combination thereof. Such determinations and evaluations may be made by a) the game manufacturer, b) the owner(s) of the server(s) upon which the game resides, c) one or more player characters, d) market forces, e) negotiation among the affected parties, f) any combination of the above.

According to one embodiment, a credit line is pinged and secured for a period of time, such as a few days, and then released. For example, the game server could ping the credit card every month, freeze the amount of credit line equal to the obligation, and if that amount of credit line is not available, lock the assets secured with the credit line and notify both parties that the credit line is not adequate to secure the property.

In one embodiment, a percentage of the real world credit line(s) may be released in proportion to or in some other ratio of the amount of the contract completed. In this example, the real world credit line held is reduced as the virtual contract proceeds, instead of waiting for the entire virtual contract to be completed, thus freeing real world credit lines for other purposes. Such a release could be managed by any means available. According to one embodiment, Release Credit Line program 146 may be configured to:

1. Receive indication that a contract milestone has been met.
2. Retrieve credit card associated with virtual contract.
3. Notify credit card issuer to release an equal or other determined portion of the credit line.

Information regarding the credit lines used to secure a virtual contract may be stored by any means applicable. In one embodiment, such information may be stored in Account database 140.

In another embodiment, the amount of a real world credit line to be frozen can be based on the exchange rate of virtual currency for real currency. According to one embodiment, the exchange rate could be one for one. Alternatively, the exchange rate may be based on the exchange rate at the time of the formation of the contract. It may also be based on the exchange rate at the time the player's credit card or other credit line is charged. In another embodiment, the exchange rate may be adjustable for the term of the contract. Such adjustments may be based on inflation, actual exchange rates, market forces or other economic indicators or a combination thereof. The exchange rate may be fixed in that the rate does not change for the duration of the game or segment of the game. Alternatively, the exchange rate may be pegged to a floating real world exchange relationship, for example the U.S. dollar/Japanese yen spot exchange rate, a percentage thereof, a plus or minus adjustment thereof, some other economic indicator, or a combination thereof. The exchange rate may also vary depending on the country of origin of the player, or may be fixed to a particular real world currency, i.e., all exchange rates are quoted in dollars. In another embodiment, the exchange rate may be floating and determined by market forces such as the relative demand for virtual currency versus real world currency. Said exchange rates may further be established or determined by any suitable method including, but not limited to, by a) the game manufacturer, b) the owner(s) of the server(s) upon which the game resides, c) one or more player characters, d) market forces, e) negotiation among the affected parties, f) any combination of the above. The exchange rate may also be composed of any combination of the above methods. For example, the exchange rate could be fixed for a certain length of time and then change to market forces or vice versa. Alternatively, there may be a cap on the amount of fluctuation in the exchange rate during the term of the contract.

In another embodiment, characters could request bids from other characters or entities to pay for an item or purchase a contract at some level of exchange that differs from the current exchange rate.

In the event of a default, the credit cards or other credit lines used as collateral may be charged according to any of a number of criteria including, but not limited to, charging all of the credit cards used to secure the virtual contract in equal percentages until the credit line is maxed out, and then in an equal percentage on the remaining credit lines until no credit line is available; in an order designated by the virtual contract, i.e. charge credit card A first up to a fixed amount, then charge credit card B, etc.; or in a ratio specified under the contract.

In another embodiment, the collateral may be a non-financial asset. Such an asset includes any item of economic value including, but not limited to, a virtual object; a virtual skill or attribute; virtual property or business; a real world object or property; a promise to perform certain services, or any combination thereof. In one embodiment, the collateral may be a collection of assets held in escrow. In the event of a default, such assets may be sold or otherwise liquidated. In one embodiment, the character retains possession of the assets in escrow, but is prevented by the game from selling or otherwise disposing of or encumbering the assets securing the contract. In another embodiment, no particular assets are set aside, but a character may be prevented from disposing of his assets below a minimum amount which would secure his obligations. Records of such holdings may be stored by any means applicable, for example in escrow account database 130. Information regarding the players and characters with assets in escrow and the conditions of the escrow may be stored, for example in player database 132 and player character database 134, respectively.

In a further embodiment, characters with a certain real or virtual credit score, who have achieved a certain amount of virtual value in a game or have reached a certain level may not be required to provide collateral for a contract. Such "financially secure" characters may vouch for less financially secure player character by offering their virtual value as collateral.

Once a virtual contract is agreed upon and the collateral is secured, the assets which are the subject of the contract may be transferred as dictated by the terms of the contract. Assets to be transferred may include virtual loan amounts, virtual dividends, virtual assets such as a good, or the results of a mission. The transfer may further include fulfillment of the terms of the contract such as the delivery of a good, the construction of a project, the payment of a fee, etc.

For example, the virtual contract could be a loan. A player character or entity may borrow virtual cash from another player character, entity, financial intermediary or the game server. Terms may include an the amount of currency the bank is willing to lend to the character, the type of collateral the bank will require, the interest rate for the loan, the term of the loan, the payment schedule for the loan, an origination fee, commitment fee, any additional fees the bank may decide to charge, annual percentage rate, if there will be a balloon payment, due date, grace period, penalties, service charge, transferability, automatic repayment, payment of other obligations, and exchange value. Such a contract could be accomplished using some or all of the following steps:

1. Receive, store, and output and post virtual cash loan request from a first player character.
2. Receive, store, and output response to virtual cash loan request including obligations and conditions from a second player character.
3. Receive acceptance of obligations and conditions from first player character.
4. Retrieve or receive credit card associated with first player character.
5. Create, activate and store a virtual contract including obligations, conditions, and credit card.
6. Receive virtual cash loan amount from second player character.
7. Issue virtual cash loan amount to first player character.

In another embodiment, the virtual contract could be to receive dividend payments. Such payments could be made to shareholders in a game environment or other investors. Some types of shares could have guaranteed dividend or other payments. The payments may be guaranteed by the owner(s) of the game environment or by a third party.

In another embodiment, the contract could be a virtual finance option. A finance option may offer a payment schedule and terms of the financing using some or all of the following steps:

1. Receive request to purchase an in game item with virtual cash from a player character.
2. Generate and output one or more virtual offers to finance the item purchase that includes a number of virtual cash payments at a specified number of time period intervals.
3. Receive an acceptance of a finance offer from the player character.
4. Retrieve or receive a credit card associated with the player character.
5. Establish and store financing contract including the virtual cash payment amount, the number of payments, the dates for each payment, and the credit card information.
6. Output virtual item to player character.

Such an arrangement could occur between players, between characters, between characters and a game environment, between players and a game environment, between players and the game, between characters and the game, or any combination thereof.

In another embodiment, a virtual contract may be entered into for the creation of a virtual item. A character may contract with a second character to produce a virtual item according to certain specifications by a particular date. If the second character does not complete the item according to the requested specifications, or by the specified time, they may be assessed a penalty. Conversely, if the contracting character does not pay for the item, they may be assessed a penalty. For example, such a virtual contract may be executed using some or all of the following steps:

1. Receive, Store and Output a request to assemble an in-game item, including at least one of (i) a virtual cash amount, (ii) a blueprint, (iii) in game natural resources and game items necessary to assemble the item, (iv) a date/time of expected delivery, and (v) the agreed upon or expected quality of the item or its constituent components.
2. Determine if parties are qualified to enter into specified contract.
   a. Determine if first player character has access to sufficient collateral or does not need collateral.
   b. Determine if second player character has appropriate skills necessary to assemble the item.
3. Receive an acceptance of the offer by a second player character including the price and a time when the item will be complete.
4. Receive or retrieve a credit card associated with the second player character.
5. Store credit card with accepted offer to assemble an in-game item.

Virtual contracts may include over the counter securities transactions, for example, futures contracts, stocks, bonds, derivatives and commodities. For example, in a futures contract, a character can agree to buy or sell a particular amount of a game resource or item at a specified virtual or real time period. A real cash value is determined that is equal to the virtual cash value of the buy or sell offer. If the player character is unable to sell or purchase the item at the specified time, they may be assessed a penalty on all or a portion of the real cash value of the contract or any combination thereof. Such transactions may be accomplished using some or all of the following steps:

1. Receive a virtual offer to buy or sell an in game item or in game resource at a specified later date and price, including an offer amount from a first player character.
2. Determine if characters are qualified to enter into specified contract.
3. Receive an acceptance of the virtual offer from a second player character.
4. Receive or retrieve a credit card associated with the first player.
5. Create, activate, and store a virtual offer contract including the credit card number of the first player character.
6. Receive virtual offer amount from second player character account.
7. Transmit virtual offer amount to first player character account (less transaction fee if applicable).

Virtual contracts may also be entered into for virtual services. Such services may include employment, the performance of some duty, assistance with a project, or help with a mission among other types of services that can be performed in a virtual environment. For example, a first character can agree to help a second character to solve a mission or other game parameter with a given time period. If the first character fails to provide the assistance agreed upon they may be assessed a penalty. Conversely, if the first character fails to pay the second character when the agreed upon assistance is provided, they may be assessed a penalty. Such a virtual contract may be entered into using some or all of the following steps:

1. Receive, store and output a virtual request for help in solving a virtual mission from a first player character including a mission, a date by which the mission must be complete an amount to pay if the mission is completed and a penalty for not completing the mission.
2. Determine if characters are qualified to enter into specified contract.
3. Receive an acceptance of the virtual request from a second player character.
4. Receive or retrieve a credit card for both player one and player two.
5. Store credit cards with request.
6. Make request active.
7. Determine if request was fulfilled by specified date.
8. If request was fulfilled charge virtual payment amount to first player character virtual account.
   a. If first player character virtual account cannot fulfill payment amount, determine real cash value for virtual payment amount and charge real cash value to credit card or insurance policy associated with first player character.
9. If request was not fulfilled, retrieve virtual penalty amount and charge amount to virtual account of second player character
   a. If virtual account of second player cannot cover virtual penalty amount, determine real cash value of virtual penalty and charge real cash value to credit card or insurance policy associated with second player character.

In some game environments, there may be difficulties in transferring virtual assets between game environments, or to different locations within the same game environment. Characters or other entities may therefore enter into virtual shipping contracts to have virtual objects delivered to certain locations by a particular real or virtual date. Such contracts may be entered into using some or all of the following steps:

1. Receive a virtual item to ship from a first player character including a present virtual location and a requested virtual location.

2. Determine and output a virtual shipping amount, delivery date, and real cash penalty amount.
3. Receive acceptance of shipping amount and delivery date from a second player character.
4. Receive or retrieve a credit card associated with second player character.
5. Create shipping contract with virtual item, shipping amount delivery date, penalty amount, and credit card.
6. Determine if item was delivered on or before delivery date.
7. If item was delivered, charge shipping amount to first player character account.
8. If item was not delivered, retrieve penalty amount.
9. Charge penalty amount to credit card.

If a virtual contract is broken or one side does not meet its end of the bargain, a penalty may be assessed. Such a penalty may be financial or non-financial. For example, the penalty may be forfeiture of the collateral securing the virtual contract, liquidation of assets, or payment of a fee. In another embodiment, the defaulting party may have one or more limitations imposed upon his actions in the virtual world by a) the bank, b) the game manufacturer, c) the owner(s) of the server(s) upon which the game resides, d) one or more player characters, e) any combination thereof. The penalty may be pre-determined, for example at the time the virtual contract is formed, may be fixed in that it does not change for the duration of the virtual contract, or may be floating. According to one embodiment, the delinquent party may be prevented from entering into other virtual contracts. In another embodiment, the player underlying the defaulting character may be blocked from converting virtual currency to real currency. In a further embodiment, a lien may be imposed upon the assets of the virtual character. In yet another embodiment, the game defaulting party may be excluded from transacting business, owning land, voting, projecting in the virtual world, or engaging in other virtual contracts within the virtual world. Additionally, or alternatively, the assets of the securing players and/or characters may be seized and sold to cover the debt, for example by using a program such as asset liquidation and redistribution 114. Assets may be sold one at a time in any order specified by the rules of the game server, i.e. most to least valuable, least to most valuable, most to least liquid, least to most liquid, etc. until the virtual obligations of the player characters are met. The proceeds from such a sale would then be deposited with the account of the injured party, for example using Receive Proceeds from Sale of Assets program 122. If the value of the assets does not cover the virtual obligations, the cash obtained may be paid in ratio equal to the obligation for each creditor compared to the total outstanding obligations or in order of priority. A creditor may be given priority based on when the virtual contract was established, based on the remaining obligation of the contract versus the total obligation, or priority may be given to third party player characters or entities over player characters/entities owned or related to the indebted character. For example some or all of the following steps may be used:

1. Determine that a virtual obligation cannot be paid with a virtual account associated with a player character.
2. Determine a real cash value for the virtual obligation.
3. Retrieve credit card associated with player character.
4. Attempt to charge real cash value of virtual obligation to credit card.
5. If attempt fails, lock virtual assets of player character account.
6. Post and sell virtual assets on appropriate in game marketplace or exchange.
7. Retrieve virtual creditor list.
8. Determine percentage of player character asset value due to each virtual creditor.
9. Transmit appropriate percentage of asset value to each virtual creditor.

If a financial penalty is inappropriate or the contract specifies a different type of penalty, some or all of the following steps may be used.

1. Determine that virtual contract has been or will be breached.
2. Impose non-financial penalty on breaching party based on:
    a. contract terms
    b. game rules
    c. agreement from one or more parties to contract
    d. random determination
3. Where non-financial penalty may be:
    a. preventing breaching party from entering into other contracts
    b. exclude breaching party from performing actions in game
    c. prevent breaching party from converting virtual currency to real currency
    d. alter virtual representation of breaching party The real world credit line used to secure the virtual contract may also be charged in real world currency to cover the amount due. In a further embodiment, the funds may be automatically debited from the account guaranteeing the funding. In yet another embodiment, a player can pay a recurring real cash fee to borrow virtual cash in a game environment. The monthly fee can be charged to the player character by the game server and a portion of the fee can be remitted, in real or virtual cash to a second player character who initiated the loan.

In another embodiment the virtual representation of the character can be altered to indicate that the character has violated a contract. For example, a character's avatar may be forced to wear a certain item of clothing, wear or have a symbol associated with the avatar (such as a defaulter sign, black cloud, or other recognizable symbol), state that he is in default of a virtual contract when speaking to other characters, etc.

In a further embodiment, if a payment is missed, any preferential terms may be subject to change. For example, the interest rate could increase, payment terms could accelerate, guaranteed exchange rates could become variable, caps on interest or exchange rates could be removed, etc.

In a further embodiment, the virtual contract could be secured using a virtual credit card. Players or player characters may be offered a virtual credit card when they open an account with the game or with a financial intermediary.

An exemplary system 200 as shown in FIG. 3 may be configured to provide the environment described above. As shown, system 200 may include a game server 202, a bank or other financial intermediary server 204 and a credit card server 206.

Game server 202 may include programs such as credit card upsell 210, credit worthiness program 212, and payment terms 214. Game server 202 my further include databases such as player database 218 and player character database 218. Bank server 204 may include an account database 220, a player database 224, an interest program 222 and a player character database 226. Credit card server 206 may include programs such as an exchange rate program 230, a ping credit card program 232, a lock credit card program 234 and payment options program 236.

In one embodiment, when a player creates an account or creates a character, a program such as credit card upsell program 210 may offer a virtual credit card to the player or the character. The virtual credit card may be used to secure virtual contracts and may or may not be linked to a real world credit line such as a credit card, debit card, private or public payment facilitator account (i.e. paypal), brokerage account, equity line, play time card, escrow account, margin account, annuity account or other financial security and/or the financial security of another player character and/or a non-playing third party, such as a bank, credit institution, credit card company, mutual fund, hedge fund, insurance company, etc. or any combination of these or any other type of real world financial instrument or institution that provides a credit line or holds or secures assets for third parties. In another embodiment, the virtual credit card may require pre-payment using either virtual or real currency and the available credit may equal the pre-payment amount or some multiple thereof. A determination of the type of offer to present to a player or character may be based on an analysis of creditworthiness using credit worthiness program 212. Credit worthiness program 212 could run an analysis of the credit of the player or character being offered a credit card using a multitude of factors including, but not limited to, types of bills owed by the character/player, the timeliness of payments, loans outstanding, credit lines available, length of credit history, new credit applications, income, marital status, length of time playing the game, real credit score, character skill level, or any combination of the above. Credit worthiness may be based on real and virtual information available for the player alone or in combination with the credit score of the character(s) controlled by the player. In a further embodiment, credit worthiness may determine the terms of the credit card such as the grace period, the limit and the interest rate.

Information regarding the player may be stored, for example, in player database 216. Such information may include information such as Player ID, Billing Info, Personal Info, Character ID 1-n, Credit history, Virtual accounts, Date of account activation. Information regarding the characters controlled by the player may be stored in player character database 218 and may include such information as Character ID, Character Credit Score, Character Assets and Attributes, Character Obligations, and Character Skill Level.

Once a virtual credit card is issued, information regarding the account may be stored, for example on bank server 204. Such information may be stored, for example in Account database 220. Account database 220 may include information such as account number, Player ID, Character ID, Account number, balance, and terms such as grace period, interest rate, minimum payments, and limits. The interest on a particular account may be calculated using interest program 222. Interest may be simple interest or compounded and may be calculated according to the terms of the credit card agreement. Information regarding the players and characters holding accounts may be stored in player database 224 and player character database 226. In one embodiment, players and/or characters may be notified when virtual credit card payments are due. In another embodiment, payments may be deducted automatically from accounts. In the event that a player or character is delinquent, the real world credit line securing the virtual credit card may be charged.

Various programs on credit card server 206 may determine the functioning of the credit card. For example, payment of credit card bills may be made in real currency, virtual currency, or a combination thereof. Rates of exchange for payment may be determined, for example by exchange rate program 230.

According to one embodiment, the exchange rate could be one for one. In another embodiment, the exchange rate could be determined when the account is opened. Alternatively, the exchange rate may be based on the exchange rate at the time the player's credit card or other credit line is charged. In a further embodiment, the exchange rate may be determined at the time payment is due. The exchange rate may be fixed for a particular segment of the game or ay be pegged to a floating real world exchange relationship, for example the U.S. dollar/Japanese yen spot exchange rate, a percentage thereof, a plus or minus adjustment thereof, some other economic indicator, or a combination thereof. The exchange rate may also vary depending on the country of origin of the player, or may be fixed to a particular real world currency, i.e., all exchange rates are quoted in dollars. In another embodiment, the exchange rate may be floating and determined by market forces such as the relative demand for virtual currency versus real world currency. Said exchange rates may further be established or determined by any suitable method including, but not limited to, by a) the game manufacturer, b) the owner(s) of the server(s) upon which the game resides, c) one or more player characters, d) market forces, e) negotiation among the affected parties, f) any combination of the above. The exchange rate may also be composed of any combination of the above methods. For example, the exchange rate could be fixed for a certain length of time and then change to market forces or vice versa. There may also be an introductory exchange rate that may change after a certain length of time. In one embodiment, there may be a cap on the amount of fluctuation in the exchange rate for particular accounts.

When payments are due, a variety of payment offers may be made to the player or character holding the account. For example, account holders may be allowed to pay all or a portion of the balance. Additionally, account holders may be offered "vacations" from payment during particular time periods when no payment is due even if a balance is in existence. In one embodiment, such payment options may be determined by Payment Options program 236.

When a character or player uses the virtual credit card to secure a virtual contract, the availability of credit on the credit card may be verified using Ping Credit Card Program 232. According to one embodiment, Ping Credit Line program 232 may be configured to complete some or all of the following steps:
1. Receive notification that virtual credit card has been submitted to secure virtual contract.
2. Determine virtual cash value of contract.
3. Ping credit card for the outstanding virtual cash value of the virtual contract.
4. If credit equal to virtual contract amount is not available, request additional collateral.

In the event a credit line securing the virtual contract is cancelled or closed, the system could receive notification that the credit card or credit line is no longer valid. Upon notification that a credit line is no longer valid, the bank, system, game owner, server owner, or other contract holder may invoke termination provisions or notice of default provisions. For example, the contract holder may require cancellation of the virtual contract, acceleration of the virtual contract, require the player to provide a new credit line, require additional collateral to secure the virtual contract, foreclose on the virtual contract, secure a secondary line of credit which was previously provided or may be secured from other player characters, notify other characters of the opportunity to purchase a contract, foreclose on virtual assets held by the defaulting character, freeze the virtual accounts of the character or player, or any combination thereof.

In one embodiment, the credit on the virtual credit card securing the contract may be frozen using lock credit card program 234. Such a lock could prevent a character or player from over extending themselves and ensures that there is available credit to protect the other party to the virtual contract. The lock on the virtual credit line may be released when the virtual contract is completed. According to one embodiment, Release Credit Line program 238 may be configured to:
1. Receive indication that virtual contract or portion of virtual contract has been completed.
2. Retrieve credit card associated with virtual contract.
3. Release credit line.

Alternatively, as the virtual contract proceeds or certain milestones within the virtual contract are met, a percentage of the virtual credit line(s) may be released in proportion to or in some other ratio of the amount of the virtual contract completed. In this example, the virtual credit line held is reduced as the virtual contract proceeds, instead of waiting for the entire virtual contract to be completed, thus freeing virtual credit lines for other purposes. Such a release could be managed by any means available. According to one embodiment, Release Credit Line program 238 may be configured to:
1. Receive indication that a virtual contract milestone has been met.
2. Retrieve virtual credit card associated with virtual contract.
3. Release portion of credit line.

According to some embodiments, credit card programs such as ping credit card program 232, lock credit card program 234 and release credit card program 238 could be layered such that if the virtual credit card is secured by a real world credit line and the virtual credit card is used, the real world credit line could be pinged, locked or released. For example, a ping of the virtual credit card would trigger a ping of the real world credit line underlying the virtual credit card.

Figure 5:
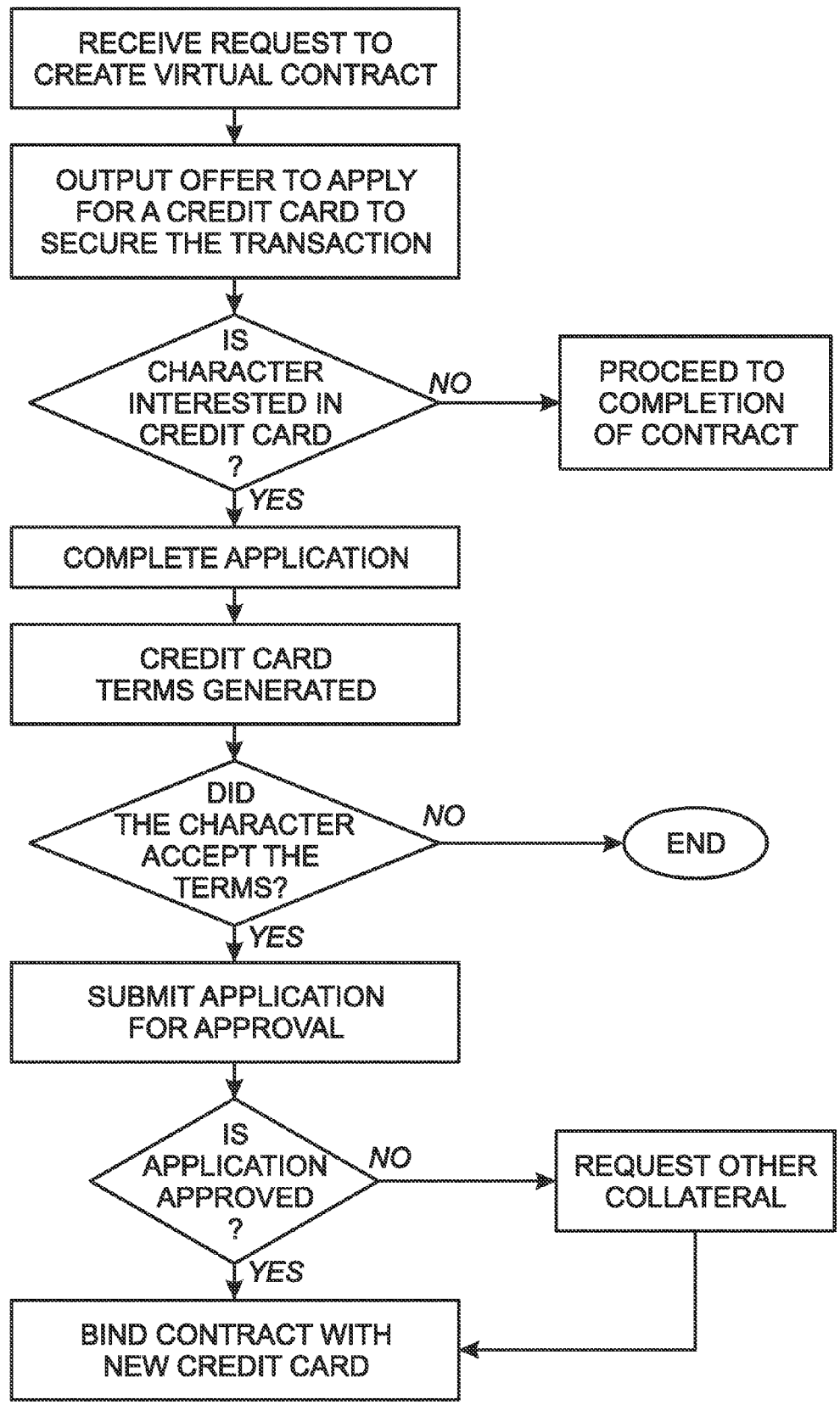
FIG. 5 is an embodiment of a method of securing a contract.

In another embodiment, virtual credit cards may be offered as part of a financing option or other virtual contract agreement to secure the virtual contract. For example, if a purchase of virtual good or service is made using credit, the vendor may offer a virtual credit card to the purchaser to use for purchasing the virtual good or service as shown in FIG. 5. In another embodiment, if an insurance policy is purchased, a virtual credit card may be offered to secure the virtual insurance policy. The virtual credit card may be linked to a real credit line and used to secure the purchase or other contracts within the virtual world. The vendor may receive a commission for the acceptance of a virtual credit card by the purchaser. Such a commission may be a percentage of the fees generated by the initial purchase or on all purchases or contracts secured by that card.

In one embodiment, virtual credit cards, regardless of when acquired, may have reward programs. Player characters that make use of virtual credit cards may accumulate points based upon their usage and/or payment habits. Points may be exchanged for real or virtual objects and/or real or virtual cash. Points may be exchanged for virtual skills, favors, training or education, secrets or secret codes, that, for example, permit entry into a specific area, or solves a puzzle, or provides a hint to solve a puzzle, or provides a "get out of jail free card" or an option to "go back in time" or to improve a player's strength, or recovery rate, or to receive part or all of any maps, avatar features or upgrades, lower real or virtual interest rates, and other in game or real world products, services, devices, and the like. In a further embodiment, a card may be issued with a certain amount of credit that can be used to secure contracts with no payment obligation for the player.

According to some embodiments, the recipient of the reward may need to be specified by a player. For example, a player may have more than one character that is associated with a specific credit card. In such a case, the player may specify which character should receive the reward. Alternatively, an embodiment may allow a player to designate a beneficiary who is not a character controlled by the player. Specification may take place at the time the reward is received, before the reward is awarded, at the time the virtual credit card is obtained by the player, or at any other suitable time.

An exemplary system 300 as shown in FIG. 4 may be configured to provide the environment described above. As shown, system 300 may include a game or bank server 302 and a credit card issuer server 304. Game or bank server 302 may include a credit card upsell program 306. Credit card issuer server 304 may include a virtual cash reward generation program 308. Game or bank server 302 may further comprise multiple databases, such as, for example, a player database 310 and a player account database 312.

Player Database 310 may comprise information such as Player ID, Billing Info, Personal Info, and Character ID 1-n. Player Account Database 312 may comprise information such as: Player ID, Account Number, Credit Line Available, Credit Line Secured, Virtual Cash Payment Percentage for Secured Line, Virtual Cash Payment for Purchases made with Card, Reward Conditions, and Transactions 1-n. Credit Card Issuer Server 304 may include a virtual cash reward account database 314, which may include information such as: Account ID, Game Account ID, Reward Conditions, and Transactions n-1. Based on the information in the databases, for example in the player database 310, a vendor may decide to offer a credit card to a particular player or the character of a player using a program such as credit card Upsell program 306. According to one embodiment, credit Card Upsell Program 306 may be configured to:
1. Receive a player character log in,
2. Determine if Player Character qualifies for a credit card based on personal info, game play behavior, billing info, real world credit score and/or virtual world credit score.
3. Determine a virtual benefit for the player character if he signs up and/or uses the credit card.
4. If player qualifies output credit card upsell including benefit(s).
5. Receive acceptance of upsell offer, including personal information from player character.
6. Transmit personal information to credit card issuer.
7. Receive new credit card account information.
8. Output information to player character.

Based on the changing information in player account database 302, a vendor or virtual credit card company may decide to alter the terms of the virtual credit card. For example, the virtual credit line may be increased or decreased, the virtual interest rate may increase or decrease, the payment cycle may increase or decrease, and/or the rewards program may change.

According to one embodiment, the rewards program offered by the virtual credit card may include merchandise, gift certificates, travel rewards and other goods and services. For example, the reward may be virtual cash. Rewards, such as virtual cash may be calculated using programs such as Virtual Cash Reward Generation Program 308. Virtual cash reward generation program 308 may be configured to:
1. Receive card usage activity of a player character from card issuer.
2. Determine virtual cash reward based on conditions and usage activity.
3. Transmit virtual cash reward to player account.

Rewards of other types of assets may have ownership transferred to a player or character instead of or in addition to the deposit of virtual cash to a player account.

According to another embodiment, rewards may be convertible to real currencies. For example, Virtual Cash Reward Generation Program 308 may be configured to:

1. Determine a real cash compensation value for the virtual cash reward.
2. Transmit cash compensation value to credit card issuer for reimbursement.

According to another embodiment, Virtual Cash Reward Generation Program 308 may be configured to:

1. Retrieve usage of virtual cash reward card over a fixed time period.
2. Generate a virtual reward based on conditions and card usage.
3. Retrieve player character account.
4. Transmit virtual cash reward to player account.

According to another embodiment, Virtual Cash Reward Generation Program 308 may be configured to:

1. Output card usage activity of a player character to a game server.
2. Receive a real cash compensation value from the game server.
3. Transmit the real cash compensation value to the game server.

According to some embodiments, an entity may be limited to the number and/or value of open, secured contracts in which he may be a party at any given time. The number or value of contracts in which an entity may be a party may be determined by the type of entity (e.g. is the entity a character, group of characters, or server), the virtual or real credit score of the entity, the amount of collateral available to the entity, past history of the entity (i.e. how long has a particular character been in the game), or other characteristics associated with the entity (age, class, level in game, accumulation of contract points, etc.)

In order to protect themselves, character and game environments may obtain guarantees such as performance bonds, letters of credit, parental guarantees, surety bonds, or insurance. In one embodiment, a character could purchase insurance to cover his virtual obligations. For example, every time a virtual obligation is established, an interest in an insurance policy may be purchased for a fee. Alternatively, to avoid rampant cheating in a game, all contracts in the game could be associated with insurance policies to ensure that wronged parties are not harmed. In the event of a default, the insurance policy pays the debt or provides restitution to the harmed party. Furthermore, the breaching player could be penalized for defaulting. For example, the defaulting character's virtual credit rating could be lowered, policy rates increased, collateral requirements increased and/or future requests for entering into contracts, receiving insurance policies, or receiving the benefit of an insurance policy rejected outright. Moreover, when an insurance company (real or virtual) pays the debt, the insurance company may be allowed to seek restitution from the defaulting character.

In another embodiment, insurance may be used to protect virtual assets and/or to protect against loss if a contract is defaulted upon or otherwise falls apart. A value may be determined for the item being insured and a replacement value along with premium payments may be calculated. In the event that a character fails to make insurance payments, the insurance could lapse regardless of how many premiums have been paid. For example, a virtual insurance contract may be configured using some or all of the following steps:

1. Receive, store and output a virtual contract to insure a particular virtual item from a first player character.
2. Receive an offer to accept the contract, including at least one virtual insurance premium amount from a second player character.
3. Receive an acceptance of the virtual insurance premium amount from the first player character.
4. Retrieve or receive a credit card for both the first and second player character.
5. Activate virtual insurance contract and store credit card numbers with contract.
6. When virtual premium is due, charge premium amount to virtual account of the first player character.

In one embodiment, if the virtual premium payment cannot be taken from the virtual account of the first player character, the real cash value for the virtual premium and charge the real cash value to the player character's credit card.

In the event a claim is filed, it could be determined whether the insurance premiums have been paid, and some or all of the following steps could be executed:

1. Receive a virtual claim on a virtual insurance contract from a first player character.
2. Determine if virtual claim is valid.
3. If claim is valid, determine a virtual claim value based on virtual insurance contract.
4. Determine a second player character who issued the virtual insurance contract.
5. Output request for virtual payment for virtual claim value to a second player character.
6. If second player character does not pay the virtual payment, determine a real cash value for the virtual claim value.
7. Charge the real cash value to the credit card associated with the second player character.

In the event of a dispute, contracts could contain an adjudication clause. The contract could require that it be adjudicated by a particular third party, in a particular game environment, by a particular guild, using a particular system, for example, random chance or any other system described in the contract. Each party may secure the decision made by the adjudication by providing financial or non-financial collateral as described above with the penalty determined by the adjudication being assessed against the collateral of the losing party. A judgment may be levied using some or all of the following steps:

1. Receive and Store a determination of a virtual settlement amount to be paid by a first player character to a second player character including a virtual cash amount and a due date.
2. Receive or retrieve a credit card associated with the first player character.
3. Store credit card with determination.

In the event that a character has insufficient virtual assets for the judgment to be carried out, some or all of the following steps:

2. Retrieve determination on due date.
3. Attempt to charge virtual settlement amount to first player character virtual cash account.
4. If first player character virtual cash account can cover settlement amount, transmit amount (less applicable fees) to second player character virtual cash account.
5. If first player character virtual cash account cannot cover settlement amount:
    a. Determine a real cash value for the virtual settlement amount.

b. Charge real cash value to credit card associated with first player character
c. Convert real cash to virtual cash.
d. Transfer virtual cash (less applicable fees) to the virtual cash account of the second player character.

In the event of a default or breach of contract, a warning may be issued to the breaching character. Such a warning may provide a grace period to correct the default or fulfill the obligation. Warnings may be delivered by any method designed to attract the attention of a player. For example, warnings could be given through in game instant messaging, real world e-mail, voice mail, postal mail, or text messages. For example, some or all of the following steps may be used:

1. Generate warning message if virtual obligation cannot be met.
2. Determine that a virtual obligation cannot be paid with a virtual account associated with a player character.
3. Determine a real cash value for the virtual obligation.
4. Retrieve credit card associated with player character.
5. Attempt to charge real cash value of virtual obligation to credit card.
6. If attempt fails, output warning message to player character.

If after the warning and expiration of the grace period, the character fails to fulfill the obligation, the contract could be sold to a Virtual Collection Agency. A virtual collection entity may be a virtual business, another player character, virtual bank, or other lending institution, NPC, or game server, any or all of which may serve as a collection agency.

The collection agency may pay the contract holder or the injured party an up front fee and/or percentage of the total outstanding debt or value of the contract, in exchange for the potential future value of the final collected amount or value of the contract upon completion, i.e., a discount payment or other amount for the "transfer of paper", and/or may remit a percentage of the final collected amount to the note holder and retain the balance for its efforts. The collection agency may also take possession of the liens on any real or virtual property and/or take actual possession of same and either hold it until the contract is honored or settled (i.e., akin to a pawn shop) and/or sell the assets to recover part or all of the penalty or value of the contract.

When a player character signs up for a virtual credit card or enters into any other indebtedness or note, he may also be required by the lender to agree to permit such a transfer of his obligation, whether for collections on a default or otherwise.

Alternatively or additionally, a holder of a note or other indebtedness, or the injured party in a defaulted contract may sell or assign part or all of such loan, contract or other debt in exchange for a portion or all of such note. In this way, lenders may reduce their risk and/or free up their credit lines so that they can focus on securing new loans.

Figure 6:
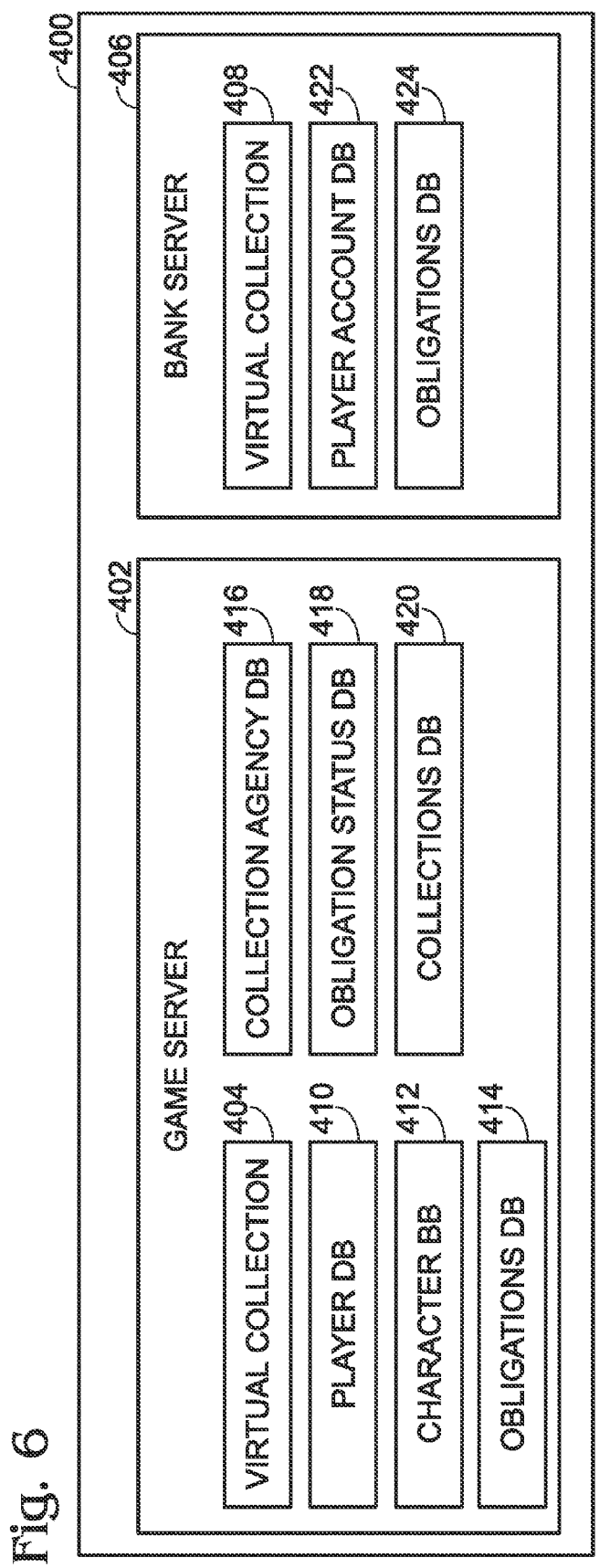
FIG. 6 is a block diagram depicting a system 400 according to one embodiment of the present invention.

FIG. 6 provides a block diagram of an exemplary system 400 suitable for use with the above-described embodiments. As shown, system 400 includes a game server 402 which may host, for example, a virtual collection program 404. System 400 further includes a bank server 406, which may host, for example, a virtual collection program 408.

Game Server 402 may include a plurality of databases including, but not limited to, a player database 410, a player character database 412, an obligation database 414, a collections agency database 416, an obligation status database 418, and a collections database 420.

Databases may store information regarding the players, the characters controlled by the players, the accounts held by the collections agency, the obligations of the characters and/or players, etc. For example, in one embodiment, Player Database 410 may include data such as: Player ID, Player Personal Information, Player Billing Information, Real World Credit Score, and Player Characters 1-n. In another embodiment, Player Character Database 412 may include data such as: Character ID, Character Credit Score, Character Assets and Attributes, Character Obligations, Obligation Status. In a further embodiment, Obligation Database 414 may include data such as: Obligation ID, Obligation Descriptor, Obligation Terms and Conditions, and Obligation Penalties. In yet another embodiment, Collections Agency Database 416 may include data such as: Collections Agency ID, Collections Agency Descriptor, Collection Types, Penalty Types, and Collection Methods. In a further embodiment, Obligation Status Database 418 may include data such as Obligation Status ID, Obligation Status Descriptor, and Obligation Status Actions. Collections Database 420 may include data such as: Collection ID, Collection Agency ID, Player Character ID, Penalty Method, and Collection Terms and Conditions.

Additional databases may be found on bank server 406 including, but not limited to, player character account database 422 and an obligation database 424. Player character account database 422 may include such information as Player Character ID, Account ID, and Obligation ID 1-n. An obligation database may link specific obligations to the characters that have the obligation. For example, obligation database 424 may include information such as Obligation ID, Player Character ID, Obligation Penalties, and Obligation Terms and Conditions.

According to one embodiment, contracts and other obligations may be bought and sold. In one embodiment, game server 402 may be configured to set up conditions for obligation transfer at the time the obligation is created. Accordingly, game server 402 may be configured to:

1. Receive an obligation request from a player character.
2. Determine conditions for obligation transfer (to a virtual collection agency).
3. Output conditions to the player character.
4. Receive acceptance of conditions from the player character.
5. Create Obligation for the player character.

If the character defaults on the obligation, it may be transferred for example to a collection agency. In another embodiment, the holder of the obligation may sell the obligation in order to free assets.

In one embodiment, the determination that the obligation is due could be made automatically. For example using some or all of the following steps:

1. Determine that a virtual obligation payment is due.
2. Charge obligation payment to player character account.
3. If player character account cannot cover obligation payment, determine a real cash value of the obligation (including fees and/or penalties and fines)
4. Charge real cash value to player credit card.

In another embodiment, the delinquency of an obligation may be reported to a third party such as a governing entity, the game, or for adjudication. For example, 1. Receive a complaint that a first player character could not pay a second player character a virtual obligation payment.
2. Determine if complaint is valid.
3. If complaint is valid determine or retrieve a real cash value of obligation payment.
4. Charge real cash value to credit card associated with first player character.

5. Pay second player character the virtual obligation payment (in real or virtual cash).

In a further embodiment, if a character or player attempts to circumvent a contract, for example by hacking the system or breaking the rules, they may be assessed a penalty. The penalty may be assessed using some or all of the following steps:

1. Determine that a player character has committed an infraction.
2. Determine a penalty amount.
3. Retrieve credit card associated with player character.
4. Charge credit card penalty amount.

Types of transactions may be limited by the level of participation of the player or player character. Such limitations could depend upon the skill, experience, and sophistication of the authorized user and/or the player's real or virtual credit score and/or real or virtual current or predicted income levels. For example, players may advance through different levels of play and after achieving certain benchmark standards or having an account established for a particular length of time, they may be granted wider access to financial intermediaries and the services provided by such intermediaries.

It will be appreciated that while, for the sake of discussion, various databases have been described separately, the data in these and any other suitable databases could be merged into a single large databases and/or maintained separately in additional databases, or in other structures besides a database. Moreover, any such databases could be independent or linked, and the data in these databases could be stored centrally on a server or separately on game devices.

The present disclosure provides numerous systems and methods related to virtual environments in online computer games. It should be appreciated that numerous embodiments are described in detail and that various combinations and subcombinations of these embodiments are contemplated by the present disclosure.

Conclusion

Of course it will be appreciated that the systems methods described herein are provided for the purposes of example only and that none of the above systems methods should be interpreted as necessarily requiring any of the disclosed components or steps nor should they be interpreted as necessarily excluding any additional components or steps. Furthermore, it will be understood that while various embodiments are described, such embodiments should not be interpreted as being exclusive of the inclusion of other embodiments or parts of other embodiments.

The invention is described with reference to several embodiments. However, the invention is not limited to the embodiments disclosed, and those of ordinary skill in the art will recognize that the invention is readily applicable to many other diverse embodiments and applications as are reflected in the range of real world financial institutions, instruments and activities. Accordingly, the subject matter of the present disclosure includes all novel and nonobvious combinations and subcombinations of the various systems, methods configurations, embodiments, features, functions, and/or properties disclosed herein.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. § 1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

I claim:

1. A method performed by a computer, the method comprising:
   providing, by a Video Game Central Server, a virtual environment in which virtual entities are able to interact with each other;
   receiving, by the Video Game Central Server, a request from a first entity to enter into a virtual contract with a second entity;
   determining, by the Video Game Central Server, a contract value for the contract;
   determining, by the Video Game Central Server, if the first entity is eligible to enter into the virtual contract by determining if the first entity has sufficient collateral to secure the contract;
   determining, by the Video Game Central Server, if the first entity is required to secure the virtual contract;
   receiving, by the Video Game Central Server, a financial security from the first entity if the first entity is required to secure the virtual contract;
   forming, by the Video Game Central Server, the virtual contract; and
   storing, by the Video Game Central Server, terms associated with the virtual contract;
   wherein determining if the first entity has sufficient collateral to secure the virtual contract comprises:
      determining the contract value in real world funds and
   receiving information related to a real world financial account and
   pinging the account to determine if the account has sufficient funds to cover the initial contract value.

2. The method of claim 1 wherein determining the contract value in real world funds comprises
   determining an exchange rate between real world funds and virtual funds and
   applying the exchange rate to the contract value.

3. The method of claim 1 where the financial account information is a real world credit card number.

4. The method of claim 1 further comprising
   periodically pinging the real world financial account during the term of the contract to determine if the first entity has sufficient funds to cover the contract value.

5. The method of claim 3 further comprising
   imposing a penalty on the first entity if the real world financial account does not have sufficient funds to cover the contract value.

6. The method of claim 5 wherein imposing a penalty comprises delivering a warning message to the first entity.

7. The method of claim 5 wherein imposing a penalty comprises preventing the first entity from engaging in an activity in the virtual environment.

8. The method of claim 4 further comprising
   freezing sufficient funds in the real world financial account to cover the contract value.

9. The method of claim 4 further comprising, during the term of the contract, periodically determining a current contract value and periodically pinging the real world financial account to determine if the first entity has sufficient collateral to cover the current contract value.

10. The method of claim 1 further comprising:
    determining an initial contract value at the time the contract is formed;
    freezing sufficient funds in the real world financial account to cover the initial contract value; and
    releasing some of the funds as the contract is completed.

11. An apparatus comprising:
    a processor; and
    a computer readable medium in communication with the processor;
    in which the computer readable medium stores instructions which, when executed by the processor, direct the processor to
       provide a virtual environment in which virtual entities are able to interact with each other;
       receive a request from a first entity to enter into a virtual contract with a second entity;
       determine a contract value for the contract;
       determine if the first entity is eligible to enter into the virtual contract by determining if the first entity has sufficient collateral to secure the contract;
       determine if the first entity is required to secure the virtual contract;
       receive a financial security from the first entity if the first entity is required to secure the virtual contract;
       form the virtual contract; and
       store terms associated with the virtual contract;
       wherein determining if the first entity has sufficient collateral to secure the virtual contract comprises:
          determine the contract value in real world funds and
          receive information related to a real world financial account and
          ping the account to determine if the account has sufficient funds to cover the initial contract value.

* * * * *